G. O. DEGENER.
COMBINED TYPE WRITING AND COMPUTING MACHINE.
APPLICATION FILED OCT. 25, 1913.
1,273,832.
Patented July 30, 1918.
2 SHEETS—SHEET 1.
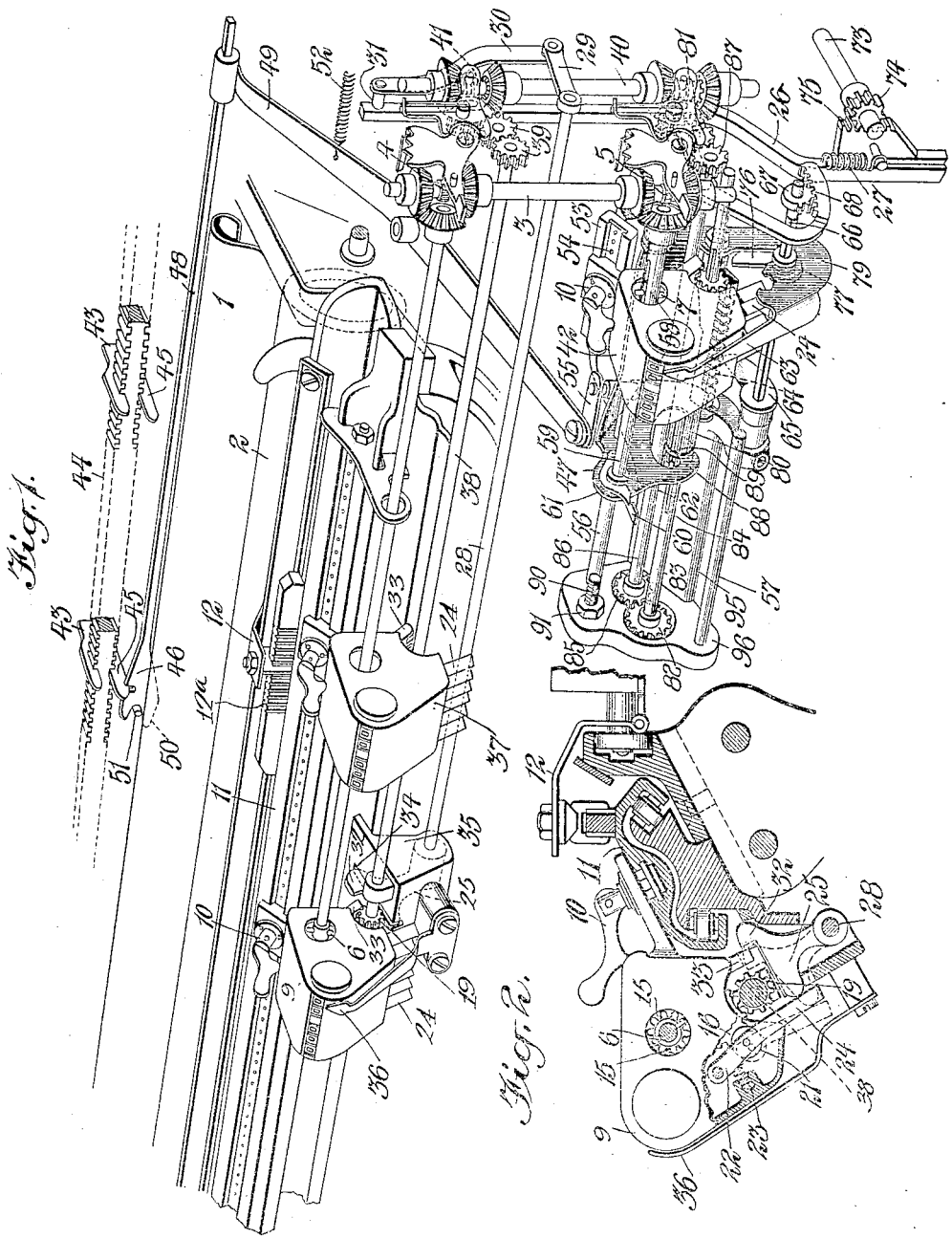
WITNESSES:
Geo. W. Taylor
H. V. Westphal
INVENTOR:
Gustave O. Degener
BY B. C. Stickney
ATTORNEY.

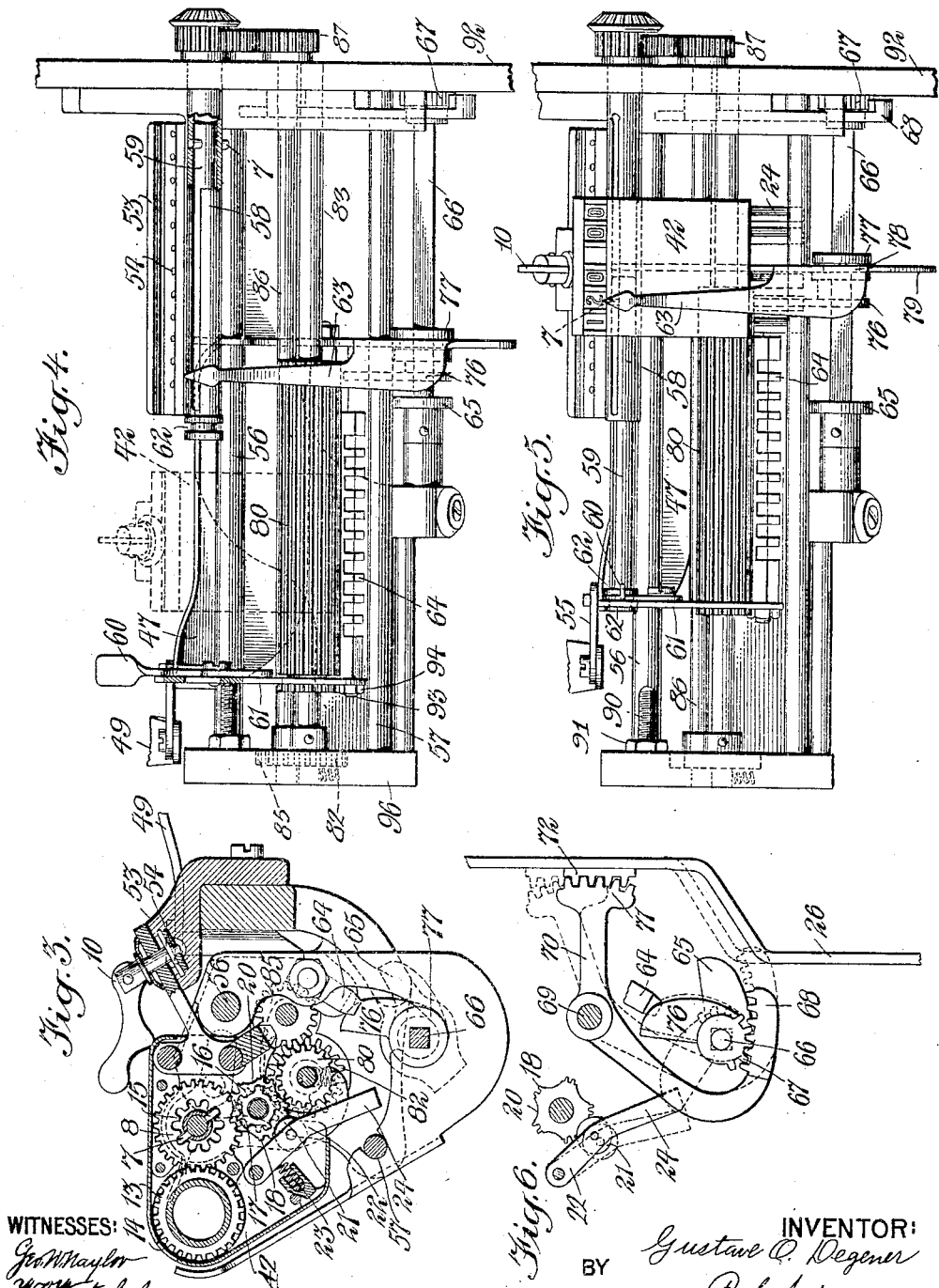

UNITED STATES PATENT OFFICE.

GUSTAVE O. DEGENER, OF BRONXVILLE, NEW YORK, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,273,832.      Specification of Letters Patent.      Patented July 30, 1918.

Application filed October 25, 1913. Serial No. 797,150.

*To all whom it may concern:*

Be it known that I, GUSTAVE O. DEGENER, a citizen of the United States, residing in Bronxville, in the county of Westchester and State of New York, have invented certain new and useful Improvements in Combined Type-Writing and Computing Machines, of which the following is a specification.

My invention relates to computing machines, especially combined typewriting and computing machines in which it is desirable to have interchangeable totalizers which may be easily and readily removed or adjusted in the machine.

My invention is herein shown as applied to a combined typewriting and computing machine of the Underwood-Wright type of the form disclosed in my prior application No. 728,803, filed October 31, 1912 (now Patent No. 1,260,759, dated March 26, 1918). In said machine, as is usual in the Underwood-Wright combined typewriting and computing machine, the mechanism comprises a platen carriage which causes a computing carriage to travel along therewith and carry a totalizer mounted on said computing carriage, so as to cause its computing wheels to engage *seriatim* with a master wheel, said master wheel as is usual being power-driven and turning at every depression of a numeral key to an extent depending upon the number key depressed.

Said machines, as is disclosed in said application, also include a second computing carriage which is adapted to be connected to travel intermittently with the typewriter carriage. Said second carriage in the Underwood-Wright machine, as disclosed in said application, carries along with it as it travels, a master wheel which engages *seriatim* the computing wheels of a second totalizer, said second totalizer being usually used for cross adding. In such machines it is desirable to have said second totalizer easily removable or replaceable with longer or shorter totalizers, so that the machine may be readily adapted for different kinds of work by an operator of ordinary skill; but usually in combined typewriting and computing machines built for one kind of work, the mechanism is so complicated that it is beyond the skill of an ordinary operator to readjust or replace the cross totalizers without calling in the services of an expert repairman. According to the present invention, said second totalizer may be mounted on a rack-bar on a frame of the combined machine by means of a clamp which is adapted to engage said rack-bar at letter-space intervals so that said totalizer is removably and adjustably mounted on said rack-bar.

Since in said Underwood-Wright machine the master wheel usually is mounted on a shaft extending through the totalizer, it is desirable to provide some means whereby said shaft may be slid out of the way when it is desired to remove a totalizer.

According to the present invention, the master wheel shaft of said second totalizer may be connectible to its computing machine carriage by a latch, which latch may be swung to ineffective position. When the latch is thus swung to release the master wheel shaft, said shaft may be slid to one side, leaving an open space wide enough to permit that totalizer to be lifted away. Thus, if desired, another totalizer or totalizers may be substituted for the cross totalizer which has been in position. By providing all of said totalizers with the usual interchangeable clamp of the Underwood-Wright machines, said totalizers may be interchangeable with any totalizer on the main computing machine carriage.

To insure accuracy of work, the computing wheels of said Underwood-Wright machines are usually provided each with a detent which normally holds its wheel against rotation, the active wheel, however, being released from its detent at each depression of a numeral key. As shown in my aforesaid co-pending application No. 728,803, filed October 31, 1912, the act of releasing a detent is utilized to lock the computing machine carriage against travel, thus insuring that the computing carriage will not travel while the master wheel is turning.

According to my present invention, the releasing of the detent and the locking of the computing machine carriage may be made part of the controlling mechanism for each of the computing machine carriages. For this purpose, every totalizer may be provided with a rack-bar between the teeth of which a locking tooth is swung at the depression of every numeral key. For the totalizer on one computing carriage, said locking tooth may be formed integral with the tooth which releases the detent. The other computing machine carriage may be provided with a detent releasing tooth which, with every depression of a numeral key, is swung to release the detent of the active computing wheel. If the totalizer is fixed, said releasing tooth may travel along with the second computing carriage, thus releasing the detents *seriatim*. This second carriage may itself include a rack-bar, which coöperates with a second locking tooth, said second locking tooth always rocking with the releasing tooth of this second carriage. Since one of these teeth may travel with the computing carriage and one may be fixed, one of said teeth may advantageously be slidably splined on the shaft which drives both of them, so that said shaft will form a single member controlling both of said teeth.

When this construction is used, the locking rack on the totalizer itself may be functionless for the time being. By however having such a rack, said totalizer is always adapted to be used interchangeably in connection with either the first or the second computing machine carriages. It will be noted that by having the totalizers adjustable at letter-space intervals, it becomes possible to have an assortment of widths of totalizers having clamps fixed thereto, which clamps may adjustably engage the different rack-bars to hold any totalizer thereon.

Other features and advantages will hereinafter appear.

In the accompanying drawings,

Figure 1 is a perspective view of so much of an Underwood-Wright combined typewriting and computing machine of the kind disclosed in my said application No. 728,803, as is convenient for illustrating my invention as applied thereto.

Fig. 2 is a cross section taken near the master wheel at the center of the combined machine.

Fig. 3 is a cross section of the cross totalizer and some adjacent parts.

Fig. 4 is a front view of the parts seen in Fig. 3, showing in dotted lines the totalizer which is being removed.

Fig. 5 is a view similar to Fig. 4 showing the totalizer in place and in use.

Fig. 6 is a detail showing the connections for releasing a computing wheel and for locking the computing carriage.

As is described in the application above referred to, the numeral keys (not shown herein) when depressed, cause the usual Underwood-Wright typewriter carriage 1 to be fed to the left in the usual manner, so that type (not shown herein) will print on a work-sheet passed around the platen 2 in said carriage.

Said machine also includes the usual drive-shaft 3 which at every depression of a numeral key is rotated by a motor (not shown herein) to an extent determined by the numeral key depressed, and through the usual clutches 4 and 5 causes master wheels 6 and 7 to rotate the computing wheels 8 with which they engage to an extent determined by the numeral key depressed.

For causing the master wheel 6 to engage *seriatim* the computing wheels 8 in a totalizer 9 to turn them, said totalizer is mounted on the usual computing carriage 11 being settable therealong at letter-space intervals by the usual clamp 10. Said carriage is carried along with the typewriter carriage 1 by the usual arm 12, said arm engaging the usual rack 12ª which has its teeth at letter-space intervals. The computing wheels 8 are constantly in mesh with dial wheels 13 from which the numbers may be read through the usual sight-opening 14. Each totalizer is of the general type shown in my application No. 775,621, filed June 25, 1913, and includes the internal teeth 15 on the computing wheels, by which teeth the computing wheels are turned by the master wheel 6.

Each computing wheel is constantly in mesh with a carry-over wheel 16, which carry-over wheel once in each revolution of the computing wheel next lower in denomination is struck once by a special tooth in the usual manner on such a wheel, and is given a part of a turn by means of teeth 17. Said turning is not, however, sufficient to turn the computing wheel engaged by the carry-over wheel 16 to show a new digit in front of the sight-opening 14. To turn the carry-over wheel sufficiently to do this and thus complete the carry-over, each carry-over wheel also comprises the usual teeth 18 which, when the carry-over wheel begins to be turned by the computing wheel next lower in denomination, are struck by the teeth of a constantly revolving roll 19 so that said roll will turn the carry-over wheel 16 through one-fifth of a revolution, thereby rotating its computing wheel and dial wheel one-tenth of a revolution and completing the carry-over. This roll may be regarded for some purposes as a booster for the carry-over.

Between each group of teeth 18, the carry-over wheel 16 has a cut-away portion 20 with which a detent 21 coöperates, said detent being in the form of a roll mounted on an arm 22 and held against its computing wheel by means of a spring 23, thus holding the computing wheel against accidental turning and preventing the computing wheel from being overthrown by the roll 19.

Means are provided whereby, whenever a computing wheel is being turned by the master wheel 6, its detent 21 is moved to ineffective position. For this purpose, the detent arms 22 are provided with extensions 24 which a releasing arm 25 lying about in the plane of the master wheel 6 automatically strikes, so as to carry the detent 21 clear of its computing wheel. To accomplish this the computing mechanism is provided with the control bar 26, which, as described in my application No. 728,803, filed October 31, 1912, at every depression of a numeral key is tripped so that it is drawn upwardly by a spring 27 to effect various automatic combinations in the computing devices.

One of the devices controlled by the bar 26 is a shaft 28 on which the releasing arm 25 is fast, the connections shown herein being such that whenever the bar 26 is released, by a numeral key, it rocks the shaft 28 to bring the releasing arm 25 forward against the extension 24 of the detent arm 22, moving said arm to the dotted line position seen in Fig. 2, thereby carrying the detent roll 21 clear of the carry-over wheel 16. The connections for accomplishing this include an arm 29 fast on the shaft 28 which is joined by a link 30 to a pin 31 fast on the control bar 26.

At the same time that the detent 21 is moved out, the releasing arm 25 locks the computing carriage 11 against travel. For this purpose, the releasing arm 25 is provided with an extension 32 which normally stands clear of the totalizer 9. When, however, the releasing arm 25 comes forward to move the detent 21 to ineffective position, the extension 32 enters between teeth 33 of a rack fast on the totalizer 9, thus holding said totalizer and the computing machine carriage on which it is mounted against traveling.

The extension 32 is formed as a bevel tooth so that if the computing carriage is not accurately centered, it will be moved to proper position by the coöperating bevel faces of the extension 32 and the rack 33.

To give the arm 25 and its extension 32 sufficient rigidity to hold the totalizer 9, said arm and extension work in a slot 34 on a bracket 35 fast on the frame of the typewriter, which bracket also forms a journal for the shaft 28. Fast on the bracket 35 is also a pointer 36 which coöperates with the dial wheels 13, to indicate which one is engaged with the master wheel 6. The mechanism frequently also includes a second totalizer 37 like the totalizer 9 fast on the computing carriage 11, and also operable by the master wheel 6.

The carry-over roll 19, which has been described as constantly driven, is also usually resiliently mounted and driven by a shaft 38 which is geared by gear wheels 39 to the usual carry-over drive-shaft 40 through the usual clutch 41, said clutch shifting in the usual manner simultaneously with the clutch 4.

The combined typewriting and computing machine, as shown in my application No. 728,803, also includes a totalizer 42 which is operated by the master wheel 7, said master wheel being intermittently connected to the computing machine carriage 11 and typewriter carriage 1. The connections for so connecting the master wheel include the usual tabulating stop 43 on the rack bar 44 of the typewriter carriage 1, which stop comprises a lug 45 adapted to intercept, as it travels along, a hook 46, and thereby cause a second computing carriage 47 to carry the master wheel 7 step-by-step with the typewriter carriage 1. The connections for bringing this about include the usual arm 48 on which the hook is mounted, said arm being connected to the usual forwardly-extending lever 49 with the result that as the typewriter carriage 1 moves to the left, the computing carriage 47 moves to the right until the typewriter carriage brings a cam 50 on the hook 46 against a releasing lug 51 on the typewriter frame, which lug, as the typewriter carriage travels along, moves the hook 46 downwardly out of the path of the lug 45, thus disconnecting said hook from the typewriter carriage. When said hook is thus disconnected, the hook and the computing carriage 47 are returned to their normal starting point by a spring 52.

According to my invention, the totalizer 42 is provided with the usual clamp 10 which is settable along a rack-bar 53 fast on the main frame, said rack-bar provided at letter-space intervals with centering openings 54 for accurately locating the clamp 10 with its totalizer 42.

The totalizer 42 comprises the usual dial wheels, computing wheels and carry-over wheels such as have been described in the totalizer 9, and also the detents 21 and detent arms 22 and extensions 24, so that said totalizer 42 may be identical with the totalizer 9 and interchangeable therewith.

The computing carriage 47 is connected by a link 55 to the forward end of the lever 49 and slides along guide rails 56 and 57 carrying along with it the master wheel 7. Said master wheel, as is usual in this class of machines, is driven by the drive-shaft 3 through the clutch 5, which clutch drives said master wheel by means of the usual drive-shaft 58, said master wheel 7 as is usual being formed on a shaft 59 which is slidable within the shaft 58, so that the teeth of said master wheel 7 extend through slots in the shaft 58. Thus said master wheel 7 is in effect splined on the shaft 58.

The master wheel shaft 59 is connected to the carriage 47 by a latch 60 pivoted on the end wall 61 of the carriage 47, so that said latch may be thrown upwardly to ineffective position. In its normal effective position, said latch 60 lies between collars 62 on the master wheel shaft 59 and so causes said shaft to travel with the carriage 47, one of said collars having a bearing in the carriage to support the shaft 59.

The carriage 47 also includes an extension carrying a pointer 63 for indicating which dial wheel 13 of the totalizer 42 is engaged by the master wheel 7. Said carriage 47 is adapted to be locked against travel whenever the control bar 26 is released at the depression of a numeral key, to cause the master wheel 7 to turn. For this purpose, said carriage is provided at its rear side with teeth 64 fast thereon with which coöperates a locking tooth 65, said tooth 65 being rocked to locking position between the teeth 64 whenever the control bar 26 is released. To bring this about, the tooth 65 is fast on a shaft 66, which shaft is geared to be turned by the movement of the control bar 26. Said gearing includes a gear wheel 67 fast on the shaft 66, with which gear wheel meshes a swinging rack 68 forming part of an arm pivoted at 69 on the machine frame, said arm having a sort of bell crank arm 70 extending therefrom, which bell crank arm ends in a toothed segment 71 which meshes with teeth 72 on the control bar 26.

The connections are such that whenever the control bar 26 rises to permit a computation, the tooth 65 enters between the teeth 64, thus locking the computing carriage 47 against movement. The return of the control bar 26, after the computation is effected, as described in my application No. 728,803, by the power driven shaft 73 which causes a pinion 74 working in a rack 75 to move said shaft downwardly, and by such motion, carries the tooth 65 clear of the rack teeth 64, thereby permitting the computing carriage 47 to travel along.

As the computing carriage travels along, it carries with it a releasing tooth 76 which, whenever the control bar 26 is released, releases the detent 21 from the computing wheel then engaged by the master wheel 7. For this purpose, the tooth 76 is formed as the extension of a collar 77 slidable along the square shaft 66 and always turning therewith. Said collar 77 has an annular slot 78 which is engaged by the base 79 of the pointer 63, and so the travel of the pointer with the carriage 47 brings the releasing tooth 76 always opposite the computing wheel which is about to be turned by the master wheel and thereby releases said wheel whenever the control bar 26 is released. Thus the shaft 66 forms a single member for releasing a computing wheel and simultaneously locking the computing carriage coöperating therewith against travel.

The arrangement of the teeth 65 and 76 is shown in the end view, Fig. 6, wherein it will be seen that the tooth 65 rocks upwardly and the tooth 76 rocks forwardly, each into the dotted line position seen in said figure, when the control bar 26 assumes its dotted line position also seen in said figure.

According to the present invention, the carry-over assisting roll 80 of the totalizer 42 is carried along by the carriage 47, so that said carry-over roll will be effective only on the carry-over wheels 16 which are higher in denomination than the master wheel. For this purpose, said roll, as usual, is carried on resilient bearings (not shown herein) and driven by the usual clutch 81 from the carry-over power-shaft 40, which clutch 81 always shifts with the clutch 5.

The carry-over roll 80 is thus driven by a gear 82 fast on the shaft 83, to which shaft said roll is slidably splined by a slot 84, and said gear 82 meshes with a gear 85 on a shaft 86 extending over from beyond the left-hand of the carriage 47 to a frame at the right-hand, where it carries a gear 87, which gear in the usual manner, is geared to the clutch 81.

The carry-over roll 80 is caused to travel with the carriage 47 by means of an arm 88 extending downwardly from said carriage into an annular slot 89 on said carry-over roll, the opposite end of said carry-over roll being nearly in the plane of the master wheel.

To remove the totalizer 42 it is necessary to free it from the master wheel shaft which passes through it. To do this, it is best to move the carriage 47 to the left as far as possible, until it is arrested by a stop 90 in the form of an adjustable screw provided with a jam-nut 91. With the carriage 47 in this position, the latch 60 may be thrown upwardly to release the master wheel shaft, which may then be shoved over to the right, leaving a space, as seen in Fig. 4, into which the totalizer 42 may be moved after releasing its clamp 10, and from such space the totalizer may be lifted without striking any other part.

It will be noted from Figs. 4 and 5 that to the right of the computing carriage 47 and the totalizer 42, there is a fixed plate 92 not seen in Fig. 1, in which plate the ends of the shafts 66 and 83 are journaled, thus forming an adequate support for said shafts. The extension 79 of the carriage 47 at the base of the pointer encircles the collar 77 sufficiently to serve as a guide for steadying the carriage as it travels along.

The rack-bar on the carriage 47, which includes the teeth 64, is bolted to said carriage by threaded extensions 93 which extend through the plates forming the ends of said carriage onto which said extensions are screwed nuts 94. Thus by the interposition of washers, the adjustment of said rack-bar on the carriage may be made very accurately.

The left-hand end of the shaft 66 is journaled in an extension of the typewriter frame forming the plate 95, which plate carries the end piece 96 in which is carried the resilient journal of the carry-over roll 80.

Variations may be resorted to within the scope of the invention, and portions of the improvements may be used without others.

Having thus described my invention, I claim:

1. In a computing machine, the combination with a master wheel and a totalizer comprising computing wheels, of a traveling carriage for causing *seriatim* engagement of said master wheel and computing wheels, a shaft for said master wheel extending through said totalizer, a latch holding one end of said shaft, and a guide for said carriage along which the carriage is slidable, to free the totalizer from the shaft after the latch is released.

2. In a combined typewriting and computing machine, the combination with a traveling carriage and a master wheel, of a shaft for said master wheel, a releasable latch for holding said shaft to travel with said carriage, a driving shaft concentric with said master wheel shaft, said shafts being slidable on each other but turning together, a journal for said driving shaft at the end opposite said latch, and a totalizer through which said shafts extend, and removable past said shafts when said latch has been released and one of said shafts has been slipped along the other to provide an opening wide enough for the totalizer.

3. In a computing machine, the combination with a totalizer and a master wheel, of a shaft for said master wheel extending through said totalizer, a master wheel carriage supporting said shaft, and a latch on said carriage to hold said shaft to said carriage.

4. In a computing machine, the combination with a totalizer and a master wheel, of a shaft extending through said totalizer, a carriage for said shaft, a latch on said carriage to hold said shaft to said carriage, and a collar on said shaft comprising a slot which is engaged by said latch, said collar forming the bearing of said shaft in said carriage.

5. In a computing machine, the combination with a totalizer and a computing carriage associated therewith, of a second totalizer associated therewith, a second carriage for said second totalizer, a set of computing wheels in each totalizer, a detent for each computing wheel, a separate feed lock for each carriage, a single member for each carriage for controlling its lock and a detent, and a single member operating said first-named single members.

6. In a computing machine, the combination with a totalizer and a computing carriage, of a master wheel forming part of said carriage, computing and carry-over wheels in said totalizer, and a carry-over booster forming part of said carriage and carried thereby into position to be effective on only the carry-over wheels at least as high in denomination as said master wheel.

7. In a computing machine, the combination with a totalizer and a computing carriage, of a master wheel forming part of said carriage, computing wheels in said totalizer driven by said master wheel, a shaft on which said master wheel is slidably splined, a carry-over booster traveling with said carriage, and a shaft to which said booster is slidably splined.

8. The combination with a typewriter carriage, of a cross-totalizer adjustable lengthwise of the travel of said carriage, a traveling master wheel for said totalizer, reciprocated under the control of said carriage, and means adjustable lengthwise of the travel of said carriage for placing the master wheel under control of the carriage; the extent of reciprocation of said master wheel being greater than the width of the totalizer.

9. The combination with a traveling carriage, of a single cross-totalizer master wheel having a given length of travel and capable of traveling in step with the carriage, a plurality of alternative totalizers which may have different capacities, to coöperate with said master wheel, and a support for said totalizers of such length as to permit the use of totalizers having different capacities with said master wheel and to afford adjustment of all of the totalizers along said support; the range of travel of said master wheel being sufficient to enable it to operate any of said totalizers wherever adjusted.

10. The combination with a traveling carriage, of a plurality of totalizers, some column-totalizers and certain cross-totalizers, master wheels for driving said totalizers step by step, adjustable means for mounting certain of said totalizers on said carriage to travel therewith, so as to give variable periods of activity of the totalizers, one of said totalizers being comparatively fixed with respect to said carriage when in action, an adjustable mounting for said fixed totalizer of such a length as to permit the varying of activity with respect to the travel of said carriage, and adjustable means controlled by said carriage for varying the activity of the master wheel of said fixed totalizer to coördinate with the activity of the remainder of said totalizers.

11. The combination with a traveling carriage, of a plurality of totalizers, master wheels for driving said totalizers step by step, certain of said totalizers traveling with the carriage, and certain of said totalizers being stationary with respect to the travel of the carriage, certain of said master wheels being stationary with respect to the carriage and certain of said master wheels traveling in step with the carriage, each of said totalizers including a plurality of computing wheels driven by said master wheels, detents for said computing wheels, locks for preventing relative traveling movements between the totalizers and the master wheels whether the master wheel or the totalizer travels, and a unitary control for all of said detents and said locks, so that the action of the totalizers may coördinate with each other.

12. The combination with a typewriter carriage, of a series of column-totalizers, a master wheel for said totalizers, said carriage being connected to effect relative movement between said master wheel and said column-totalizers, a cross-totalizer, a master wheel for said cross-totalizer, and means operating intermittently during a single run of said carriage for effecting relative reciprocation between the cross-totalizer and its master wheel, said cross-totalizer being interchangeable with any of said column-totalizers, and being also adjustable, the range of reciprocation of the cross-computing element being such as to deal with totalizers of different sizes, to permit the cross-computing master wheel to operate the cross-totalizer wherever the latter may be adjusted.

13. The combination with a typewriter carriage, of a series of column-totalizers, a master wheel for said totalizers, said carriage being connected to effect relative movement between said master wheel and said column-totalizers, a cross-totalizer, a master wheel for said cross-totalizer, and means operating intermittently during a single run of said carriage for effecting relative reciprocation between the cross-totalizer and its master wheel, said cross-totalizer being interchangeable with any of said column-totalizers, and being also adjustable, the range of reciprocation of the cross-computing element being such as to deal with totalizers of different sizes, to permit the cross-computing master wheel to operate the cross-totalizer wherever the latter may be adjusted, the column-totalizers being mounted for simultaneous adjustment as a unit, to agree with the adjustment of the cross-totalizer.

GUSTAVE O. DEGENER.

Witnesses:
D. BAYLIS,
G. J. KUNEY.

Copies of this patent may be obtained for five cents each, by addressing the "Commissioner of Patents, Washington, D. C."